United States Patent
Gummalla et al.

(10) Patent No.: US 8,394,552 B2
(45) Date of Patent: Mar. 12, 2013

(54) JET FUEL BASED HIGH PRESSURE SOLID OXIDE FUEL CELL SYSTEM

(75) Inventors: Mallika Gummalla, Long Meadow, MA (US); Jean Yamanis, South Glastonbury, CT (US); Benoit Olsommer, South Glastonbury, CT (US); Zissis Dardas, Worcester, MA (US); Robert Bayt, League City, TX (US); Hari Srinivasan, Avon, CT (US); Arindam Dasgupta, West Hartford, CT (US); Larry Hardin, East Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1089 days.

(21) Appl. No.: 11/524,348

(22) Filed: Sep. 19, 2006

(65) Prior Publication Data

US 2008/0070078 A1 Mar. 20, 2008

(51) Int. Cl.
*H01M 4/48* (2010.01)
(52) U.S. Cl. .................. 429/488; 429/479
(58) Field of Classification Search .......... 429/12–46, 429/120
See application file for complete search history.

(56) References Cited

U.S. PATENT DOCUMENTS

| | | | |
|---|---|---|---|
| 5,413,879 A * | 5/1995 | Domeracki et al. | 429/30 |
| 6,299,995 B1 * | 10/2001 | Abdo et al. | 429/17 |
| 6,485,852 B1 | 11/2002 | Miller et al. | |
| 6,641,084 B1 | 11/2003 | Huber et al. | |
| 6,834,831 B2 | 12/2004 | Daggett | |
| 2002/0004152 A1 * | 1/2002 | Clawson et al. | 429/17 |
| 2003/0230671 A1 | 12/2003 | Dunn | |
| 2004/0124308 A1 * | 7/2004 | Daggett | 244/58 |
| 2005/0008913 A1 * | 1/2005 | Phillips et al. | 429/26 |
| 2005/0042488 A1 * | 2/2005 | Niedzwiecki et al. | 429/30 |
| 2006/0057060 A1 * | 3/2006 | Sun et al. | 423/651 |
| 2006/0099467 A1 * | 5/2006 | Cutright et al. | 429/13 |
| 2006/0188760 A1 * | 8/2006 | Hershkowitz et al. | 429/17 |
| 2006/0292410 A1 * | 12/2006 | Kaupert et al. | 429/20 |

FOREIGN PATENT DOCUMENTS

| | | |
|---|---|---|
| JP | 11135139 A | 5/1999 |
| WO | 2004040680 | 5/2004 |

* cited by examiner

*Primary Examiner* — Ula C Ruddock
*Assistant Examiner* — Jacob Marks
(74) *Attorney, Agent, or Firm* — Bachman & LaPointe, P.C.

(57) ABSTRACT

A power system for an aircraft includes a solid oxide fuel cell system which generates electric power for the aircraft and an exhaust stream; and a heat exchanger for transferring heat from the exhaust stream of the solid oxide fuel cell to a heat requiring system or component of the aircraft. The heat can be transferred to fuel for the primary engine of the aircraft. Further, the same fuel can be used to power both the primary engine and the SOFC. A heat exchanger is positioned to cool reformate before feeding to the fuel cell. SOFC exhaust is treated and used as inerting gas. Finally, oxidant to the SOFC can be obtained from the aircraft cabin, or exterior, or both.

10 Claims, 4 Drawing Sheets

JET FUEL BASED HIGH PRESSURE SOLID OXIDE FUEL CELL SYSTEM

U.S. GOVERNMENT RIGHTS

The invention was made with U.S. Government support under contract NAS3-01138 awarded by NASA Glenn Research Center. The U.S. Government has certain rights in the invention.

BACKGROUND OF THE INVENTION

The invention relates to fuel cells and, more particularly, to a solid oxide fuel cell (SOFC) system and process which is useful in connection with aircraft applications and jet fuel.

Fuel cells are a desirable alternative for use in generating electric power from hydrocarbon-based fuels more efficiently than a turbine based technology. The other advantages of having a fuel cell power the aircraft systems include, beneficial replacement of a gas turbine auxiliary power unit, reduction in the size of the main engines, reduction in emissions due to fuel cells being a cleaner technology, and reduced noise in airports due to comparatively lower number or size of rotating parts. In the case of the SOFC, the solid state technology and lower velocities of the fluid flow aid in lower noise.

Fuel cells are being considered as alternative generators for power for various applications, including power plants, motor vehicles and the like due to the higher efficiency of electrical conversion from the chemical energy of fuels like hydrogen, hydrocarbons, etc. Furthermore, it is established to be cleaner, environmentally friendly technology.

One such application is in aircraft, but use of fuel cells in aircraft applications has several advantages and disadvantages. The advantages are more efficient electrical energy generation, lesser emissions and lower noise signature. The disadvantages are the fuel cell systems tend to be heavier than their counter part gas turbine systems, with the current state of art, partly due to the need for fuel desulfurization and reformation prior to fuel cell stack input. The balance of the plant of the SOFC systems can also contribute to the weight. Additionally, the requirements for power conditioning increase the weight of the overall fuel cell based power generation unit. The other penalties of having a solid oxide fuel cell system in an aircraft may include increased drag caused by drawing air from outside, or loss in thrust due to use of air from cabin.

Jet A fuel is a typical fuel for use in aircraft applications. However, such fuel is not easily used in a fuel cell environment due to higher sulfur content and being a mixture of hydrocarbons with greater than 90% having more than 5 carbon atoms. Larger hydrocarbon molecules are not easily processed in a fuel cell, may lead to coke formation and need reformation to methane, carbon monoxide and hydrogen, which can be processed by SOFC thus minimizing the number of fuel processing reactors.

Further, in aircraft applications, redundant systems are desirable for obvious reasons.

Tight, technically sound, and beneficial integration of SOFCs into an aircraft application is therefore desirable, and is the primary object of the present invention.

It is another object of the present invention to provide a fuel cell system for aircraft applications which is effective with jet fuel, and which is efficient and reliable.

Other objects and advantages of the present invention will appear herein below.

SUMMARY OF THE INVENTION

The current invention describes a solid oxide fuel cell system fueled by jet fuel and air, beneficially integrated into an aircraft, for providing the electrical power as needed by the aircraft. The current invention describes various levels of solid oxide fuel cell (SOFC) integration into an aircraft for improved fuel burn savings, reliability, lower emissions and lower noise signature. The current design enables fuel cells to be operational within the constraints of the aircraft system and its operation, allowing for electrical power generation throughout the flight operation. The current invention presents various strategies to remove sulfur from the jet fuel, in this instance Jet A fuel, and enable stable operation of the SOFC. The current design incorporates features that improve the overall efficiency of the SOFC power generation units, while minimizing the weight penalty, by using concepts like recycle streams and tight integration with other aircraft systems. The current invention also includes strategies to enable start-up of a fuel cell system and load transients as required in an aircraft.

In accordance with the present invention, the foregoing objects and advantages have been readily attained.

According to the invention, an aircraft-based electric power generating system is provided, which comprises a fuel cell having an anode and a cathode and adapted to operate at a fuel cell temperature; a fuel reformer for reforming jet fuel into a hydrogen rich fuel at a temperature greater than the fuel cell temperature; a heat exchanger positioned between the fuel reformer and the fuel cell for reducing temperature of the hydrogen rich fuel to the fuel cell temperature; and a desulfurizer positioned between the heat exchanger and the fuel cell for reducing sulfur in the hydrogen rich stream to less than or equal to about 1 ppm. A different location for the desulfurizer could be designed depending on the sulfur content in the fuel.

In further accordance with the invention, an aircraft-based electric power generating system has been provided which comprises a fuel cell having an anode and a cathode; a fuel reformer communicated with a source of jet fuel and adapted to reform the jet fuel to a hydrogen rich fuel; a heat exchanger communicated with the fuel reformer and the anode for receiving the hydrogen rich fuel at a reformer temperature and adjusting fuel temperature to the temperature needed by the fuel cell; a desulfurizer positioned between the fuel reformer and the fuel cell for reducing sulfur in the hydrogen rich fuel to less than about 1 ppm; a source of air communicated with the heat exchanger for heat exchange with the hydrogen rich fuel so as to provide heated air, the cathode and the fuel reformer being communicated with the heat exchanger to receive the heated air; a catalytic burner communicated with fuel cell exhaust including anode exhaust and cathode exhaust for oxidizing remaining hydrocarbons and carbon monoxide in the fuel cell exhaust, exhaust from the catalytic burner being fed through the fuel reformer to supply reforming heat to the fuel reformer; a turbine expander communicated to receive exhaust leaving the fuel reformer; and a power conditioning system receiving power from the fuel cell for providing power suitable for a 270 volt bus/grid, and wherein power from the turbine is also fed to the bus/grid.

Still further according to the invention, a process is provided for generating aircraft-based electric power, which comprises the steps of providing a system with a fuel cell, a fuel reformer, a heat exchanger and a desulfurizer; feeding jet fuel, an oxygen source and heat to the fuel reformer to produce a hydrogen rich fuel at a reformer temperature; feeding the hydrogen rich fuel and a cooling stream to the heat exchanger to provide the hydrogen rich fuel at a fuel cell temperature; feeding the hydrogen rich fuel through the desulfurizer to reduce sulfur content of the fuel to less than about 1 ppm; and feeding the fuel at the fuel cell temperature to an anode of the fuel cell while feeding oxygen to a cathode of the fuel cell so as to generate power from the fuel cell.

The jet fuel can advantageously be selected from the group consisting of Jet A, Jet A-12, JP-4, JP-5, JP-8, sulfur-free synthetic hydrocarbon fuel and the like.

BRIEF DESCRIPTION OF THE DRAWINGS

A detailed description of preferred embodiments of the present invention follows, with reference to the attached drawings, wherein.

DETAILED DESCRIPTION

The invention relates to fuel cells and, more particularly, to jet fuel based high pressure solid oxide fuel cell (SOFC) systems, designed particularly for aircraft applications. The SOFC is preferably chosen to have high specific power, namely specific power greater than 0.5 kW/kg, and operate at intermediate temperatures, namely, temperature less than about 750° C. According to the invention, the SOFC is integrated into the aircraft system and utilizes a hydrocarbon fuel as a hydrogen source. The hydrocarbon fuel can be selected from the group consisting of Jet A, Jet A-12, JP-4, JP-5, JP-8, or similar hydrocarbon fuels, including sulfur-free synthetic fuel, wherein synthetic fuel denotes fuel produced from $H_2/CO$ syngas streams by a Fischer-Tropsch like processes. The group of the aforementioned hydrocarbon fuels will be referred to herein as jet fuel.

Aircraft applications involve the use of jet fuel, and operating conditions which change during the course of the aircraft flight operation, such as altitude, air pressure, temperature and power loads. Use of jet fuel such as Jet A fuel as the source of chemical energy for a fuel cell poses challenges. Further, the changes in operating conditions are potential issues in connection with application of a fuel cell in an aircraft during its complete course of flight, and these issues are resolved by the teachings of the present invention.

In accordance with the present invention, a system is provided which utilizes jet fuel as primary source of chemical energy to the SOFC system that converts it efficiently to electrical energy; wherein the system is operated under conditions which make it suitable for use in an aircraft. FIGS. 1-4 show different configurations of systems according to the invention, and each of several integrations of the SOFC into the aircraft are discussed below.

Figure 1:
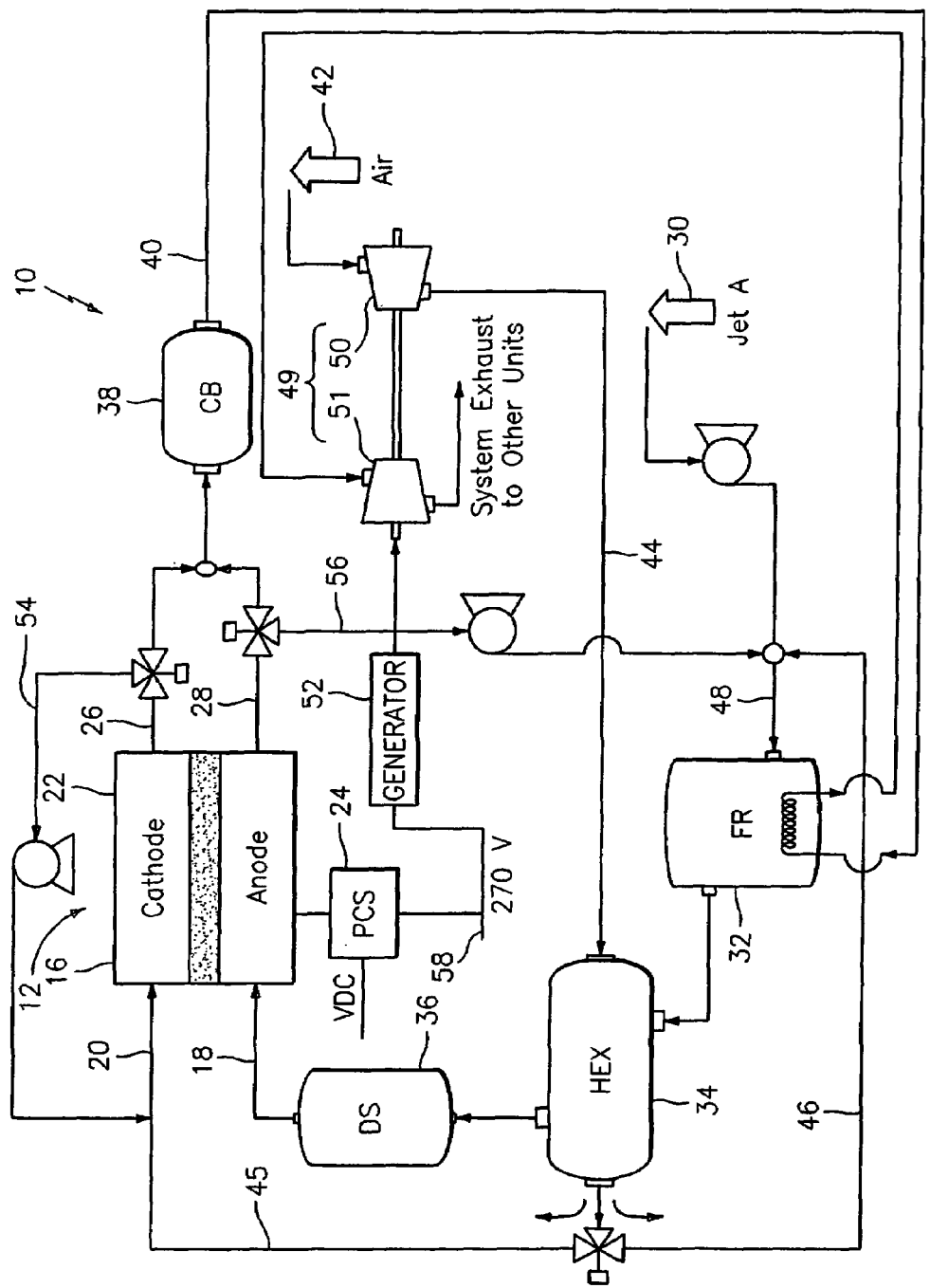
FIG. 1 schematically illustrates a system in accordance with the present invention.

FIG. 1 shows a system 10 in accordance with the present invention which includes a solid oxide fuel cell 12 and a turbo generator (including a compressor and expander), such that the system can operate above ambient pressures. Fuel cell 12 operates as is well known to a person of ordinary skill in the art by receiving reformate (also referred to herein as a hydrogen rich gas stream) at an anode inlet 18 and air or an oxygen containing gas stream at a cathode inlet 20 so as to generate a current across anode/electrolyte/cathode assembly 22 which can be fed to a power conditioning system 24 and from there to a power grid as desired. SOFC 12 generates a cathode exhaust in line 26 and an anode exhaust in line 28, the disposition of which will be further described below.

FIG. 1 shows a source 30 of jet fuel, here Jet A, which is the fuel for the primary engine of the aircraft and also for SOFC 12 in accordance with the present invention. According to the invention, jet fuel preferably mixed with some anode exhaust and some air is fed to a fuel reformer 32 where the fuel is reformed at an elevated temperature so as to produce a hydrogen rich fuel or stream, which will also be referred to as reformate. Since Jet A fuel is more difficult to reform than more common fuel cell hydrocarbon feeds, reformer 32 must be operated at a higher temperature. In accordance with the present invention, it has been found that fuel reformer 32 is advantageously operated at a temperature greater than or equal to about 750° C. so as to produce a suitably hydrogen rich fuel. At these temperatures, the reformer converts the sulfur containing molecules to hydrogen sulfide. However, fuel reformer 32 produces a reformate stream at a temperature higher than suitable operating temperatures for solid oxide fuel cells.

In accordance with the present invention, this high temperature hydrogen rich fuel from fuel reformer 32 is fed to a heat exchanger 34 for reducing the reformate gas stream temperature to a suitable fuel cell inlet temperature, preferably between about 525° C. and about 725° C. Heat extracted from the fuel is contributed to other processes of the system which utilize the heat which will be described further below.

FIG. 1 shows a desulfurizer 36 positioned between heat exchanger 34 and anode inlet 18, and desulfurizer 36 is advantageously provided so as to reduce sulfur content in the fuel to a suitable level, preferably less than about 1 ppm. For suitable desulfurization under conditions of the present system, it may be desirable to utilize an adsorbent, preferably one or more metal oxides, within desulfurizer 36 which adsorbs the hydrogen sulfide produced in the reformer or present in the fuel and is resistant to the high pressures and temperatures expected within desulfurizer 36. One particularly suitable adsorbent for use in desulfurizer 36 is manganese oxide (MnO), which is very stable at the high temperatures of desulfurizer 36. Of course, other desulfurization adsorbents can be used as well, and such other adsorbents, including but not limited to manganese oxide based adsorbents are well within the scope of the present invention. Regeneration of the adsorbent can be done in a continuous process or during the start of a mission, as required. This is preferred in order to minimize the weight and volume of the components on board the aircraft and thereby to maximize fuel efficiency.

A catalytic burner 38 is advantageously provided for burning exhaust from fuel cell 12, typically for burning or oxidizing combined exhaust or at least portions of the combined exhaust from cathode exhaust line 26 and anode exhaust line 28. Catalytic burner 38 advantageously serves to oxidize any remaining or unused hydrogen, hydrocarbons and partially oxidized gases such as carbon monoxide exiting fuel cell 12 via anode exhaust line 28, and generates an exhaust stream in line 40 which can advantageously be fed to the shell side of the fuel reformer 32 to provide supplementary process heat as is needed to reform Jet A fuel as described above.

Figure 4:
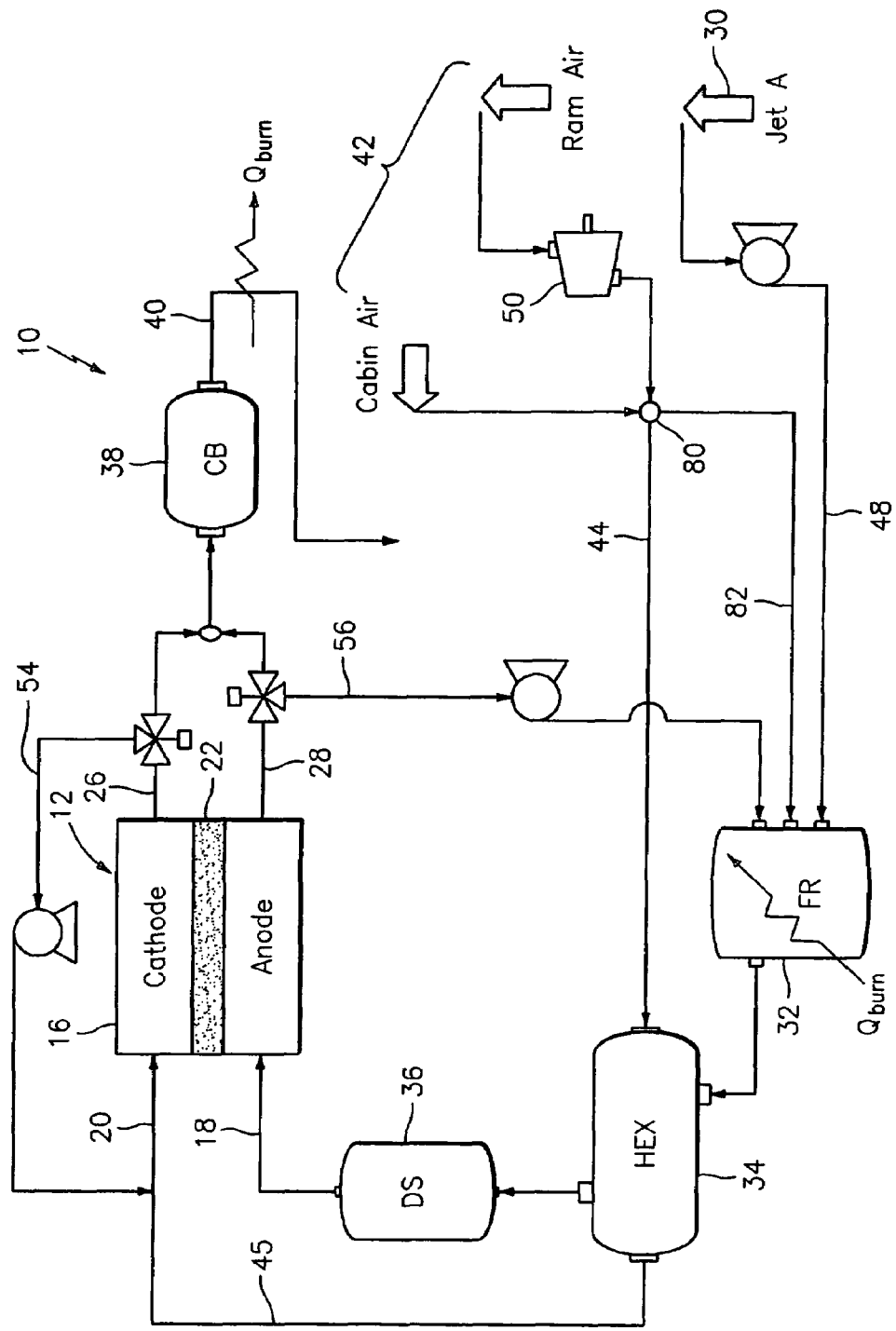
FIG. 4 shows an alternate design where the fuel cell system operates at ground or cabin air pressure.

FIG. 1 shows a source of oxygen, in this case air 42, which is pressurized by a compressor 50 of a combined cycle compressor-expander power generation unit 49, and fed into the system through line 44 and fed to heat exchanger 34 to exchange heat with hot reformate gases from fuel reformer 32. The air source is either from the cabin, or outside air or a combination thereof, depending on the electrical demand of the aircraft. This serves to cool the fuel to the desired temperature for fuel cell 12, and to heat the air or oxygen-containing stream to suitable temperatures for feeding to fuel cell 12 and also to fuel reformer 32 as shown. Specifically, heated air from heat exchanger 34 is fed through line 45 to cathode inlet 20, and is also fed through line 46 to mix with Jet A fuel at an inlet 48 to fuel reformer 32. Compressor 50 is advantageously combined with SOFC 12 to provide a hybrid power generating system in accordance with the present invention. A fuel cell based power section without combined cycle compressor-expander power generation unit 49 is shown in FIG. 4 to be described below and is an embodiment well within the scope of the present invention.

Expander 51 of unit 49 likewise generates electric power, which is accomplished using generator 52 as shown in FIG. 1, and this power can be passed to the power bus/grid 58, after appropriate conditioning, along with power from SOFC 12. Of course, unit 49 need not have turbine 51 or expander within the broad scope of the invention.

Still referring to FIG. 1, cathode 16 of SOFC 12 in accordance with the present invention can advantageously be provided with a recycle loop 54 for recycling a portion of cathode exhaust from line 26 back to cathode inlet 20. This advantageously serves to further increase the temperature of the incoming air/oxygen to the cathode, and thereby provide better heat management as desired in accordance with the present invention. In addition to better heat management, this strategy also decreases air intake by the SOFC system, reducing the size of compressor 50 and heat exchanger 34. The split of exhaust between recycle loop 54 and catalytic burner 38 is selected based on the temperature gradient desired in the stack and the utilization of oxygen desired in the cathode section of the solid oxide fuel cell. This recycle of the cathode stream exhaust enables the elimination of an air-air heat exchanger typically provided at the exit of the stack and used to preheat inlet air to the cell by cooling the exhaust air/oxygen from the cell stack.

Also as shown in FIG. 1, a portion of anode exhaust from line 28, containing water vapor generated by operation of fuel cell 12, being a high temperature stream, is advantageously fed through line 56 to mix with Jet A fuel 30 and heated air/oxygen stream from line 46 to provide inlet reactants at inlet 48 to fuel reformer 32 so as to provide heat and all necessary reactants for the reforming reactions. This further serves to provide super-heated steam to the reformer thereby mitigating the potential for carbon deposition and further enhancing the efficiency and reliability of the system of the present invention. The use of this recycle stream also allows for better utilization of the fuel and elimination of a bulky water recovery unit to provide water for jet fuel reformation.

The inputs to system 10 as described above are Jet A fuel 30, and air source 42. Outputs are fuel cell power to power conditioning system 24 and power from turbine 51, each of which are suitably conditioned and fed to the power bus/grid, 58, and an exhaust stream which passes through turbine 51 and on to other units or components of the aircraft, for disposal or other use, as described herein.

As described above, the Jet A fuel fed to SOFC 12 passes through fuel reformer 32 to heat exchanger 34 and desulfurizer 36, and from there to anode 14 of SOFC 12 where unreacted fuel components exit SOFC 12 as anode exhaust in line 28. Air 42 is drawn into line 44 and fed through heat exchanger 34, and then is split between SOFC 12 to provide the necessary oxygen, and fuel reformer 32 also to provide necessary oxygen, so as to accomplish the desired fuel cell and reforming reactions respectively.

Depending upon the quality of Jet A fuel to be utilized, additional desulfurization upstream of the fuel reformer can be desirable. Such additional desulfurization can be on board the aircraft or can be carried out on the ground to provide desulfurized Jet A fuel, if necessary. Preferably, the Jet A fuel fed to the reformer has a sulfur content of less than or equal to about 10 ppm, in which case desulfurizer 36 can be reduced in size and serves mostly as a sulfur guard bed upstream of SOFC 12.

As set forth herein, a hydrogen rich fuel as produced by fuel reformer 32 includes one which contains at least about 10% of hydrogen by volume in the form of molecular hydrogen (i.e. $H_2$) which can be acted upon by SOFC 12. The reformate produced by fuel reformer 32 typically also contains some amounts of carbon monoxide, which is a fuel for SOFC, and may contain some methane and other hydrocarbon fuels. Typical reformate composition, by volume, is preferably 15-25% $H_2$, 15-25% CO, 10% $H_2O$, 10% $CO_2$, and the remainder is inerts such as $N_2$.

The cathode recycle as described above advantageously serves to increase the incoming air stream temperature to the level needed by the fuel cell as mentioned above, and also serves to minimize weight and volume of any additional equipment which might otherwise be needed for thermal management.

The anode exhaust stream as discussed above contains water vapor produced by the fuel cell electrochemical reactions. Recycle of this stream back to the reformer provides for excellent heat integration, and also provides water vapor that facilitates the reformation reactions.

The non-recycled streams which are fed to the catalytic burner are treated to oxidize any unconverted hydrogen, carbon monoxide and trace hydrocarbons.

Exhaust stream 40 from the catalytic burner 38 being at higher temperature is advantageously fed to the shell-side of the reformer 32 thus providing heat to the reformer prior to being fed to the expander 51. The expander exhaust can then be used for other on board or aircraft applications, such as water recovery, fuel tank inerting, heating applications and/or deicing applications, for example, some of which are discussed below.

The system of the present invention can advantageously be utilized to replace the Auxiliary Power Unit (APU) and also to provide the primary source of electric power for the various electrical power systems, environmental control systems and boost power of the aircraft.

The fuel cell stack is advantageously designed to operate at a high pressure, typically greater than or equal to about 1 bar, and more preferably between about 1 and about 4 bars, so as to provide for a smaller stack size and increased efficiency. Operation capability at ground and/or cabin pressure is also an embodiment of the present invention and is shown and described below with reference to FIG. 4.

Figure 3:
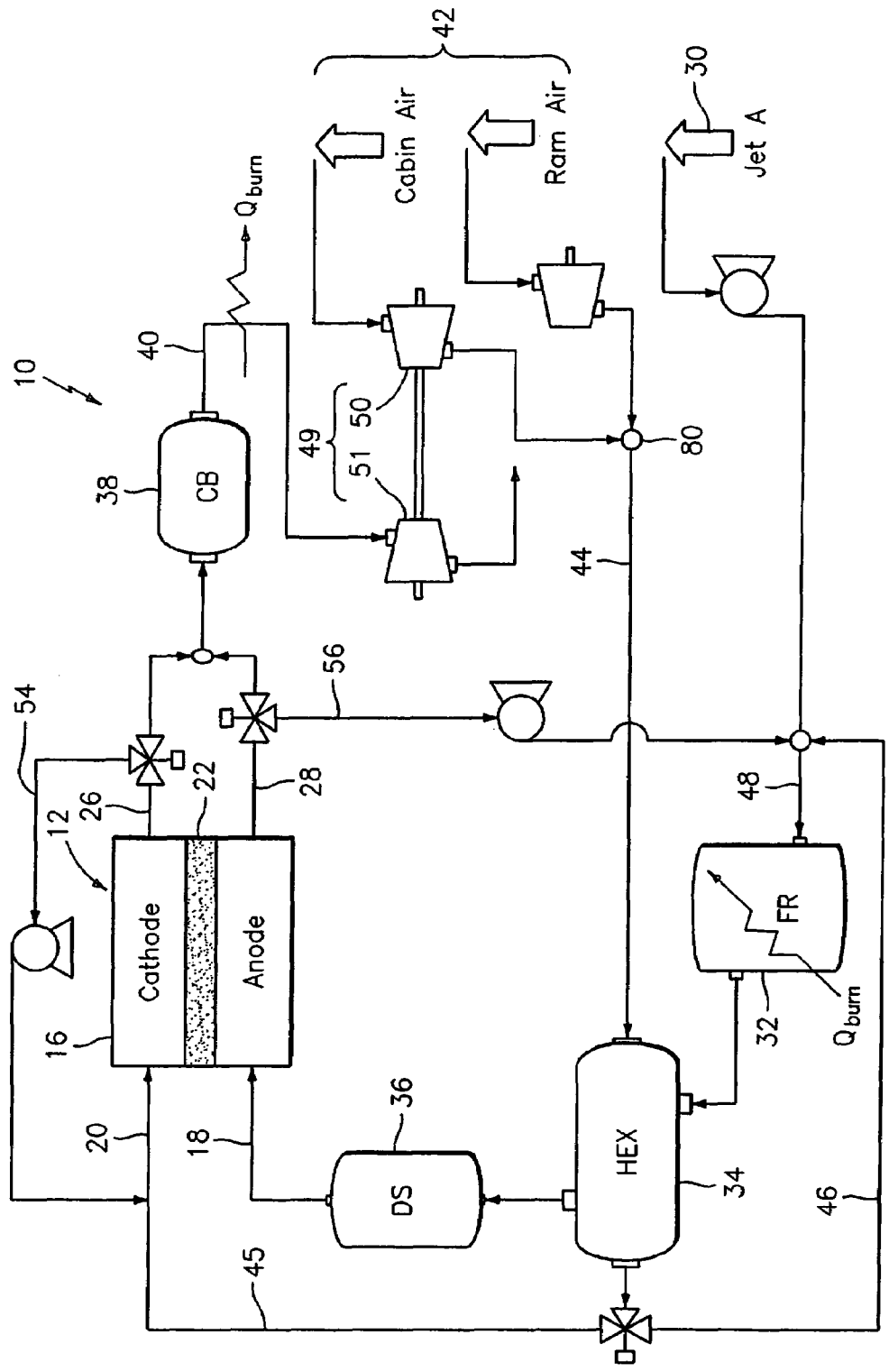
FIG. 3 shows an alternate configuration wherein the fuel cell system is integrated into the aircraft while drawing air from cabin and aircraft surroundings (ram air)

As mentioned above, during an aircraft flight or mission, outside pressure conditions can vary widely. The current system, by utilizing energy integrating concepts, and utilizing multiple compressors and expanders as shown in FIG. 1 and FIG. 3, advantageously maximizes the efficiency of the system at both ground and cruising conditions. Though only one set of turbine and compressors is shown, there are preferably two in each case, with one set being operational at ground conditions and both sets being operational during flight mission, above ground.

It is further noted that the heat exchange relationship between the reformer and catalytic burner exhaust, which takes and/or provides heat at widely varying mission point conditions, further aids in maximizing the system efficiency. This design enables operation of the reformer in a partial oxidation mode during start-up to enable rapid heat up of the cell stack, and subsequently operate in a reformer mode where the catalyst burner provides heat to the reformer, the anode recycle provides water and heat, and the air stream provides heat and oxygen so that reformer performance is optimized to maximize the hydrogen content in the reformate.

As mentioned above, if fuel desulfurization is to be accomplished separately from the system of the present invention, then desulfurizer 36 may not be needed.

The electrical power requirements in an aircraft can be met by either one single SOFC power unit or multiple sub-units, placed strategically in the aircraft. A twin system is recommended due to improved mission reliability and reduced engine-mounted generator size. Overall mission reliability improves due to loss of only half of the power supply in case of failure of one SOFC system. In addition to improved reliability, the generator size can be further reduced.

In a specific case studied, aircraft weight goes down by 54 pounds with removal of the generator (0.01% mission fuel burn savings, in a long range flight). However, a twin-system increases the SOFC system weight by 131 pounds and that of the power distribution electrical hardware by 296 pounds (a total of 0.09% mission fuel burn penalty). The overall mission fuel burn penalty for this concept is 0.08%. However, additional savings can be attained with other aspects of the invention discussed below.

Figure 2:
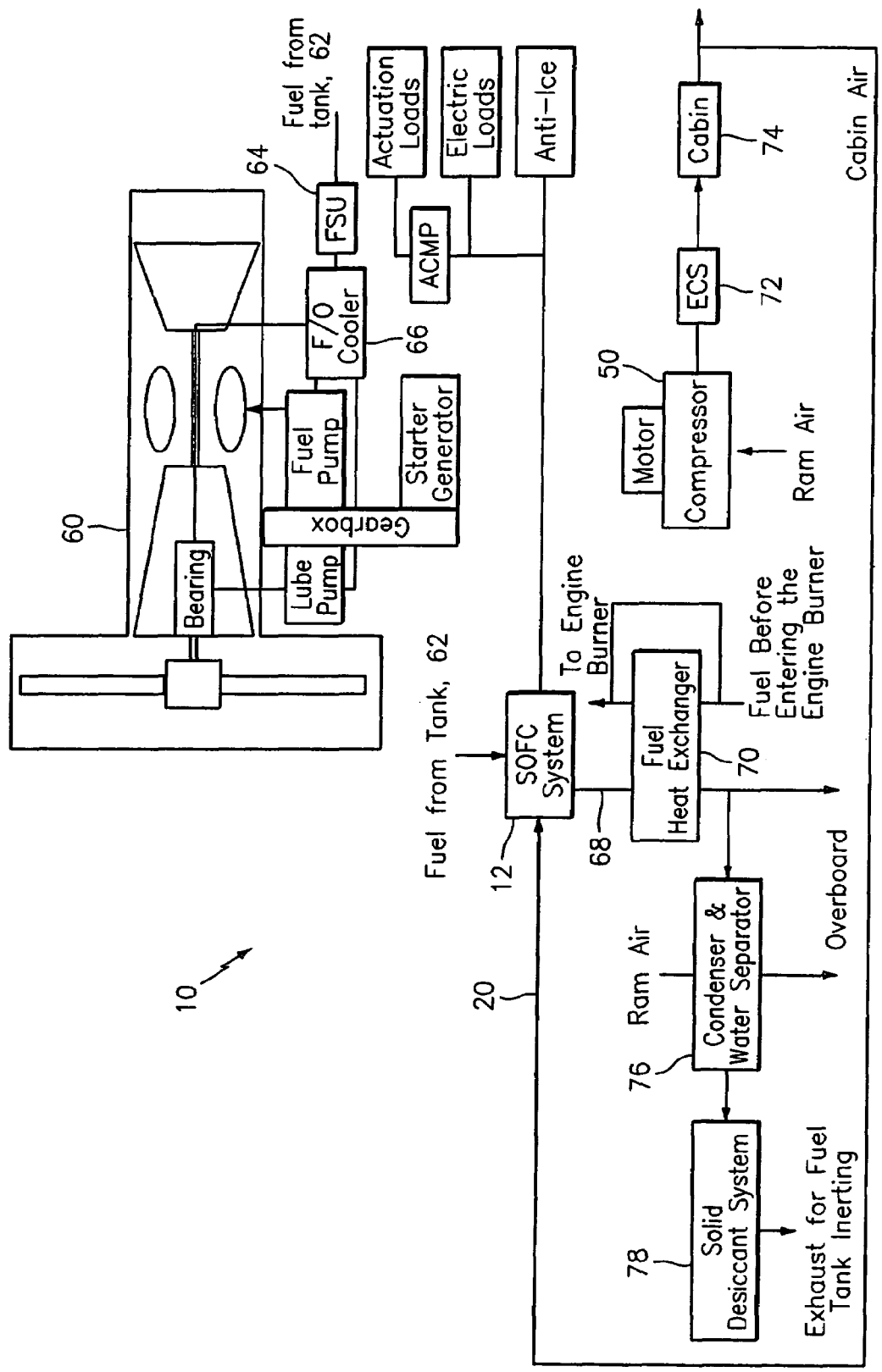
FIG. 2 illustrates an aircraft system that uses electrical energy from the SOFC power section and the exhaust from the SOFC system for providing heat, water and inerting gas.

FIGS. 2-4 further illustrate integration of an SOFC system into an aircraft system to allow for heat recovery, water recovery and on board inert gas generation. These concepts are described next, and like numerals refer to similar components with respect to FIG. 1.

FIG. 2 shows a system 10 in accordance with the invention, having an SOFC 12 which is integrated with a primary engine 60 of an aircraft. As shown, fuel 62 from a tank is provided to engine 60 through a fuel stabilization unit 64 and, if desired, a cooler 66. Examples of suitable fuel stabilization units are provided in commonly owned U.S. Pat. No. 6,939,392, which is incorporated herein by reference.

As described above, SOFC 12 acts on fuel 62 and air/oxygen containing gas to generate an exhaust stream 68 which contains heat that can be recovered and utilized.

In the embodiment shown in FIG. 2, SOFC 12 is simplified and, therefore, it should be understood that the schematic depiction in FIG. 2 includes any fuel reformer, desulfurizer, solid oxide fuel cell, and/or catalytic burner which may be needed.

In accordance with the embodiment of FIG. 2, a fuel heat exchanger 70 is provided and communicated with exhaust stream 68 so that heat from stream 68 can be transferred to other streams in a useful manner. One such stream is fuel from fuel tank 62 as it is conveyed to primary engine 60.

In accordance with the present invention, heat from exhaust stream 68 is advantageously transferred to fuel from fuel tank 62, before or after the fuel stabilization unit [64], so that fuel to primary engine 60 is pre-heated.

The exchange of heat from exhaust stream 68 to fuel in fuel heat exchanger 70 advantageously allows a pre-heating of fuel being fed to primary engine 60 to a temperature up to and preferably not exceeding 800° F. This pre-heating of the fuel heats the fuel from a typical starting temperature of about 325° F. Pre-heating of the fuel upstream of the engine combustor advantageously improves engine cycle performance. Thus, according to the invention, SOFC waste heat is used to obtain improved engine cycle performance and fuel net savings.

In another embodiment of the present invention the thermal energy of the exhaust stream 68 can be used to supply heat to de-ice the wings and other exterior parts of the aircraft. Such systems are known and do not themselves form a part of the present invention.

In another embodiment of the present invention, exhaust stream 68 of FIG. 2 can be mixed with the air intake of the primary engine 60 upstream of the combustor to improve efficiency of the combustion process and lower harmful emissions.

In a specific study, a system in accordance with that illustrated in FIG. 2, was evaluated and the additional hardware, specifically, FSU (fuel stabilization unit) system 64, fuel heat exchanger 70 and related equipment, weighed 177 pounds. This is equivalent to a fuel burn penalty of 0.04%. The resulting improvement in engine performance, however, provided a 0.3% equivalent fuel burn savings. Thus, incorporating the system as illustrated in FIG. 2 results in a net overall reduction in total fuel burn which, in this study, was equivalent to 0.26%.

FIG. 2 further illustrates additional elements and components of the system of the present invention and their integration into an aircraft power system. Specifically, FIG. 2 illustrates compressor 50 communicated with ram air and an ECS (environmental control system) 72 for providing air to the cabin 74. Air from cabin 74 can be utilized as one source of air to be fed to SOFC system 12 as shown in FIG. 2.

The exhaust stream 68 is, as set forth above, a source of waste heat which can be utilized through fuel heat exchanger 70. Following fuel heat exchanger 70, such exhaust can be vented overboard, or passed to other units for further beneficial usage. FIG. 2 shows a condenser and water separator 76 which can advantageously receive cooled exhaust from fuel heat exchanger 70 and condense and separate water from same. Thus, a dried exhaust can be vented overboard, while condensed and separated water is utilized to maintain water balance of SOFC 12 or provide water for any other aircraft needs, such as water injection into the engine during take-off or to lower emissions. The dried exhaust product from condenser and water separator 76 can also be fed to a solid desiccant system 78 to further dry the exhaust stream and render the exhaust suitable for use in inerting a fuel tank, instead of being vented overboard. Such inerting will be further discussed below.

As set forth above, and shown in FIG. 2, condenser and water separator 76 can advantageously be positioned along the flow of exhaust from SOFC 12. This advantageously allows for water recovery which involves cooling of the exhaust with ram air to recover water for various, typically non-potable uses.

This on-board water generation can eliminate the need to carry additional non-potable water on board the aircraft.

Also as set forth above, once exhaust from SOFC 12 is suitably cooled and dried, this gas can be fed to the head space of fuel tanks to provide inerting gas as desired. This allows a further system, typically referred to as an on-board inert gas generation system (OBIGGS) to be completely eliminated from the aircraft.

As with other aspects of the invention, a balancing of fuel burn penalties and savings can be conducted to determine whether utilization of exhaust gas as inerting gas provides a savings in equivalent fuel burn. In this instance, during a specific study, it was determined that the additional system hardware to implement exhaust gas inerting weighs approximately 62 pounds. This is equivalent to a fuel burn penalty of 0.01%. However, the OBIGGS system which can be eliminated results in a 0.11% equivalent fuel burn savings, and the overall mission fuel burn savings under this study is approximately 0.1%.

Still referring to FIG. 2, the Figure contains a schematic illustration of various loads which can be powered utilizing SOFC 12, including actuation loads, electric loads and anti-ice systems, as non-limiting examples.

As set forth above, changing parameters during an aircraft mission can result in issues with respect to proper SOFC system operation. The choice of operating pressure of SOFC 12 has an effect upon the overall savings obtained by integrating a fuel cell into an aircraft. By operating SOFC 12 under ambient conditions, that is, close to ground or cabin pressure conditions, parasitic power losses due to pressurization can be reduced. However, stack power density is lower at lower pressures, resulting in higher weight of the SOFC 12 and, therefore, lower power generation efficiency. Thus, a balancing of the most favorable operating pressure of SOFC 12 can be made.

As mentioned above, the supply of air to SOFC 12 can be obtained from outside the aircraft, or from the cabin, or from a combination of these two sources. Outside air, referred to as ram air, can be utilized as a sole source of air for SOFC 12. Alternatively, cabin air can be used and supplemented with ram air as necessary. When the primary source of air is cabin air, supplemental air could be needed in some cases of operation like start-up and in some aircraft designs. The need for supplemental air can be minimized by increasing the SOFC system efficiency, thus lowering the need for air.

SOFC 12 performs more efficiently due to cabin air supply since this cabin air is provided at relatively constant pressure and, therefore, requires less additional work for pressurization. Since SOFC system performance improves with cabin air, it may be desirable to provide control of this air which utilizes as much cabin air as possible and supplements with ram air as needed.

In one specific study, efficiency of an SOFC system at 450 kW increased from 48.4% to 51.8% for ground operating conditions, and from 53.2% to 65.4% during cruising operating conditions. This improvement equates to an approximate 0.34% equivalent mission fuel burn savings. Additionally, weight of the SOFC system can be decreased by 82 pounds due to reduction in size of turbo-machinery, and this provides an additional 0.02% mission fuel burn savings. Still further, utilization of cabin air reduces SOFC system ram-drag which would normally be caused by utilizing ram air. This reduction is from 32 pounds to 2 pounds due to the reduced ram-air intake.

On the other hand, there is a loss of cabin thrust recovery due to re-usage of cabin air. This results in a loss of 41 pounds of thrust, which is equivalent to 0.1% mission fuel burn penalty. Based upon the foregoing, the overall mission fuel burn savings from utilizing cabin air is approximately 0.26%.

FIG. 3 shows one configuration for alternate sources of air/oxygen to the fuel cell. FIG. 3 shows SOFC 12 with related components as discussed in connection with embodiments shown in other drawings, and includes sources of both cabin air and ram air. Ram air is drawn in from outside by a motor driven pump, while cabin air is re-circulated from the cabin, and from whichever the source, air is fed to a fuel heat exchanger for cooling fuel from the fuel reformer in accordance with the present invention.

As shown, a controller 80 can be provided and communicated with various components of the source of cabin air and a source of ram air, and can be further adapted to receive input from various components of SOFC 12, so as to advantageously make use of as much cabin air as possible during operation of the system.

In the embodiment of FIG. 4, air 42 from ram and/or cabin air can also be directed by controller 80 through line 82 to provide oxidant at fuel reformer 32.

It should readily be appreciated that the present invention provides a system and process for integrating a solid oxide fuel cell with or without a conventional turbogenerator into a power generating system for use on board an aircraft, which is efficient, compact, reliable, and offers beneficial advantages over the conventional power unit.

The system and process of the present invention thereby readily meet the above-identified objects of the invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A power system for an aircraft, comprising:
a primary aircraft jet engine and a supply of fuel communicated with the primary aircraft jet engine;
a solid oxide fuel cell system which generates electric power for the aircraft and an exhaust stream; and
a heat exchanger for transferring heat from the exhaust stream of the solid oxide fuel cell system to a heat requiring system or component of the aircraft, wherein the heat requiring system or component of the aircraft comprises the fuel communicated with the primary aircraft jet engine.

2. The system of claim 1, wherein the heat exchanger comprises a first flow path for the solid oxide fuel cell system exhaust stream and a second flow path for the fuel, wherein the second flow path is in heat exchange relationship with the first flow path.

3. The system of claim 1, further comprising an exhaust line connected between the solid oxide fuel cell system and the primary engine to convey the exhaust stream to an air intake of the primary engine.

4. The system of claim 1, wherein the heat exchanger produces a cooled exhaust stream, and further comprising a condenser for receiving the cooled exhaust stream and producing water and a dried exhaust stream.

5. The system of claim 4, further comprising a fuel storage tank storing fuel for the power system, wherein the fuel storage tank is communicated with the condenser whereby the dried exhaust stream is fed to the fuel storage tank as inerting gas.

6. The system of claim 4, further comprising a water line connected between the solid oxide fuel cell system and a water requiring system or component of the aircraft.

7. The system of claim 1, wherein the solid oxide fuel cell system has at least one cathode generating a cathode exhaust stream, and at least one anode generating an anode exhaust stream, wherein the exhaust stream comprises at least one of the anode exhaust stream, the cathode exhaust stream and mixtures thereof.

8. The system of claim 7, further comprising a cathode recycle line communicated between a cathode exhaust and a cathode inlet for recycling oxidant flow to the cathode.

9. The system of claim 1, wherein the solid oxide fuel cell system is adapted to operate at a pressure of greater than or equal to 1 bar.

10. The system of claim 1, wherein the solid oxide fuel cell system is adapted to operate at a pressure of between 1 and 4 bars.

* * * * *